3,236,423
AUTOMATIC PROPORTIONING SYRINGE
Edward P. Marbach, 4607 Marwood Drive, Los Angeles 65, Calif., and Jacob P. Marbach, 17736 Kinzie St., Northridge, Calif.
Filed Apr. 20, 1964, Ser. No. 361,002
8 Claims. (Cl. 222—309)

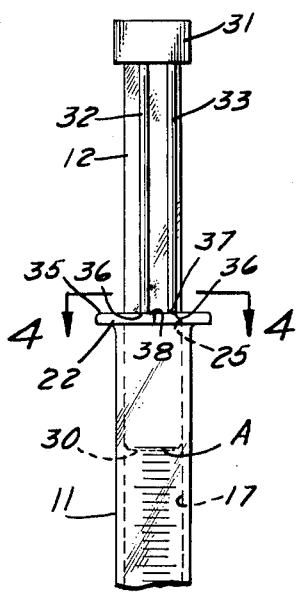
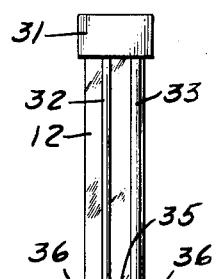
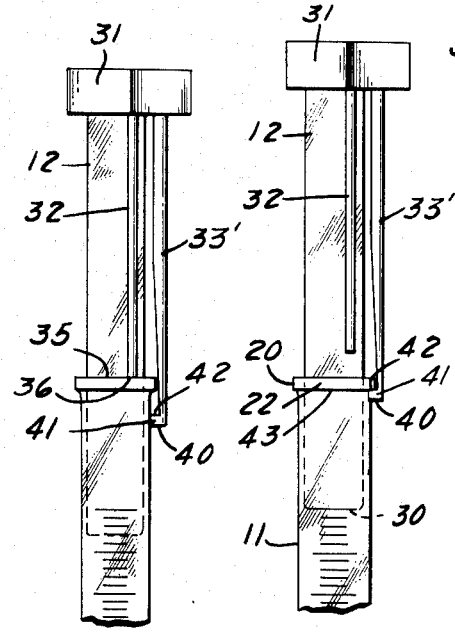
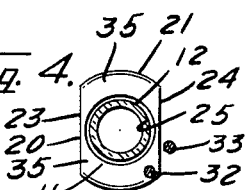
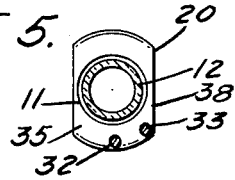
Feb. 22, 1966 — E. P. MARBACH ETAL — 3,236,423
AUTOMATIC PROPORTIONING SYRINGE
Filed April 20, 1964
Fig. 1. Fig. 2. Fig. 3. Fig. 4. Fig. 5. Fig. 6. Fig. 7.
Jacob P. Marbach,
Edward P. Marbach,
INVENTORS.
BY Vernon D. Beehler
Attorney

United States Patent Office 3,236,423
Patented Feb. 22, 1966

The invention relates to apparatus for chemical analysis and has particular reference to a proportioning device in the form of laboratory glassware which is capable of proportioning two different fluids, thereby to dilute one with the other in precise proportions for purposes of subsequent analysis.

One of the common daily needs in laboratory analysis is the analysis of blood. Determinations of this kind are taken routinely and daily by the thousands, but precise determination is critical in that it involves the life and health of humans. In order to have such determinations dependable, each analysis must be clean and clear of every preceeding analysis so that there is no inadvertent contamination. The common practice heretofore has been to make use of a separate measuring device, commonly termed a pipet, for each unknown fluid to be analyzed and to dilute it with a measured quantity of diluent. No means has heretofore been proposed for washing the pipet clear of the unknown and consequently, once used, the pipet has to be sterilized before reuse. This practice requires great quantities of glassware and the prepetual need for cleaning substantial quantities of such glassware each and every day. Further still, the pipet system of measuring the unknown fluid requires considerable physical effort in that the unknown is drawn into the pipet by mouth suction and the quantity measured in the pipet by discharging any excess or drawing in any deficiency. Further still, in measuring in this fashion, measurement is not precise, depending as it does upon the personal equation. There is accordingly a definite limit to the number of analyses which can be accomplished due in part to the fact that the technician may become fatigued. Fatigue is also a considerable factor in comparing the preciseness and dependability of the analysis.

It is therefore among the objects of the invention to provide a new and improved automatic proportioning device which can work with considerable rapidity while at the same time proportioning two fluids precisely to measure.

Another object of the invention is to provide a new and improved automatic proportioning syringe which can be used repeatedly for many operations without need for cleaning between each operation.

Still another object of the invention is to provide a new and improved automatic proportioning device for measuring two fluid samples for proportioning which is strictly automatic, thereby to eliminate errors due to the personal equation.

Still another object of the invention is to provide a new and improved automatic proportioning device for chemical analysis which, by reason of the fact that it can be continued in use time after time, eliminates errors which might arise due to differences such as are present in the use of multiple measuring devices where a different device is used for each succeeding proportioning operation.

Still another object of the invention is to provide a new and improved automatic proportioning device which minimizes the prospect of contamination of one sample with another.

Still further among the objects of the invention is the elimination of valving which has been a troublesome objection in laboratory apparatus heretofore devised in an attempt to overcome objectionable practices long recognized in this technique.

Included further among the objects of the invention is to provide a very dependable, inexpensive item of laboratory glassware which is simple, automatic, and certain in its operation, and moreover, one which is capable of being accurately and dependably used by persons with no more than a moderate amount of skill in this particular field.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a side perspective view of a complete assembly of the apparatus.

FIGURE 2 is a side elevational view of the upper portion of the apparatus in the position occupied when filled with one of two fluids to be proportioned.

FIGURE 3 is a side elevational view with the device in the condition it would have when both fluids to be proportioned have been drawn into it.

FIGURE 4 is a cross-sectional view on the line 4—4 of FIGURE 2.

FIGURE 5 is a cross-sectional view on the line 5—5 of FIGURE 3.

FIGURE 6 is a side elevational view of a second form of the device in the position of parts prevailing when filled with one of two fluids to be proportioned.

FIGURE 7 is a side view similar to FIGURE 6 showing the relationship of parts when two fluids to be proportioned have been drawn into the device.

In an embodiment of the invention chosen primarily for the purpose of illustrating the concept of the invention, there is shown what is commonly identified as a proportioning syringe identified in general by the reference character 10 and consisting of two main parts, namely a barrel 11 and a plunger 12. The syringe, moreover, is shown constructed in such fashion that it is adapted to be used with a hollow sampling needle or chamber 13.

More particularly, the barrel, usually constructed of laboratory glass, has a closed lower end 14 from which extends a fitting or extension 15 through which a relatively small opening passage 16 communicates between the exterior and an interior chamber 17. The sampling needle 13 includes a shank 18 and a base 19 in which is a suitable bore adapted to fit snugly over the exterior of the extension 15. The sampling needle is customarily readily removable at will from the barrel.

At the opposite end of the barrel is a flange 20 which, in the embodiment chosen, consists of opposite wings 21 and 22 extending partially around the perimeter of the end of the barrel 11, there being provided clearances 23 and 24 between the wings. At the end of the barrel, occupied by the flange 20, is a relatively large opening 25. Graduations 26 are often provided to indicate the fluid capacity of the barrel in cubic centimeter and fractions thereof.

The plunger is made with a smooth sliding fluid tight fit in the chamber 17 of the barrel 11. The plunger has a closed end 30 within the barrel, and at the opposite end is a handle 31. Anchored in the handle are two rods 32 and 33. These rods are spaced from the plunger 12 as indicated in FIGURES 4 and 5 by a distance sufficient to clear the outside circumference of the barrel 11 as well as being spaced far enough outwardly to clear the portion of the flange adjacent the clearances 23 and 24.

The shorter of the rods, namely the rod 32 is initially set at a length by comparison with a standard to fix the position of withdrawal of the plunger so that a fixed predetermined volume of fluid will be drawn into the chamber 17. As suggested in FIGURE 2, the graduation indicated by the reference character A may be assumed, for example, to represent five cubic centimeters. Accordingly, a free end 36 of the rod 32 is adapted to rest upon an outer surface 35 of the wing 22 of the flange 20. The length of the rod 32 as represented by the position of the free end 36 can be carefully adjusted so that when in the position illustrated in FIGURE 2 the available capacity of the barrel 11 will correspond precisely to a known standard of comparison. This can be precisely determined by comparison with the standard and hence the graduations 26 need not be depended upon for precise results.

The rod 33 is slightly longer than the rod 32 as shown in FIGURES 2 and 3. A free end 36, therefore, when resting upon the outer surface 35 of the flange 20 causes the plunger to move out a slight amount further, thereby increasing the available volume of the chamber 17 by an increment equal to the cross sectional area of the plunger times the difference in length of the rod 32 and 33.

Because this is a relatively small increment and must be capable of being precisely accomplished, the rod 33 is provided with a beveled face 37, and the beveled face 37 of the rod 33 faces an outer beveled edge 38 on the wing 22 of the flange.

In use the proportioning syringe is first customarily filled with the diluent which is a fluid used in proportionately large quantity. To accomplish this the sampling needle 13 is immersed in a flask of the diluent (not shown), the plunger pumped to make certain that all air bubbles are excluded, and then by withdrawing on the handle 31, the plunger 12 is withdrawn. During this operation, the plunger and handle are rotated to a position such that both rods 32 and 33 extend through the clearance 24 and overlie he outside circumference of the drum 11 as shown in FIGURE 1. During this operation, the fluid diluent is drawn into the chamber 17 in volume determined by the final outward position of the plunger. This position, as previously made reference to, is fixed by turning the handle 31 slightly after the rod 32 has been withdrawn far enough to clear the outer surface 35 of the flange 20, and then rotated to the position of FIGURE 2. If the plunger has been moved outwardly slightly too far, it is then pushed back till the free end 36 can be bottomed upon the flange, and this position of the plunger precisely determines the amount of available diluent in the chamber.

The next operation is to draw a desired lesser quantity of the fluid specimen to be analyzed. To accomplish this the sampling needle 13 is then immersed in a container of the second fluid subject to analysis and the plunger 12 withdrawn slightly further in an outward direction. To accomplish this with a degree of automatic precision necessary and inherent in the device, the handle 31 is merely rotated a slight amount further than it was rotated a slight amount further than it was rotated to place the free end 36 of the rod 32 on the flange. Rotation as described brings the beveled face 37 of the rod 33 into engagement with the complementary beveled edge 38 of the flange, and as rotation continues, these beveled edges, acting as cams, cam the plunger outwardly a distance which is precisely the equivalent of the difference of the length of the rod 32 and the length of the rod 33. As the rod 33 is moved by this camming action for enough, the free end 36 rides over the outer surface 35 in the position illustrated in FIGURES 3 and 5. This causes the plunger to be moved outwardly a corresponding distance, and this distance also can be previously precisely set by comparison with a standard at which time the location of the free end 36 is precisely determined. As a matter of practice, it has been found that a beveled angle of about ten degrees for the beveled face 37 and the beveled edge 38 is a good practical working angle which will make the operation smooth, easy and certain. This is particularly true where the second fluid which is to be analyzed is about five percent or less of the maximum capacity of the device.

Inasmuch as the two liquids have now been drawn into the device in the proper proportions, they are then successively discharged. Because the quantity of the second fluid is so small, this quantity will no more than approximately fill the length of the sampling needle 13 and will not be drawn into the chamber 17. When the fluids are discharged, the sampling needle is merely extended into a satisfactory flask or container, the handle 31 is rotated until both rods are in alignment with one of the clearances, namely the clearance 24 for example, and the handle 31 then pushed toward the barrel 11 so as to push the plunger 12 into the barrel until it bottoms. Inasmuch as the small quantity of the second fluid which is to be analyzed, as for example, a blood sample, is discharged first from the sampling needle, the diluent which is in substantially greater quantity, for example ninety-five percent more, is discharged through the sampling needle, and during this forced discharge is in sufficient quantity to wash the sampling needle entirely clean of the second fluid which is being sampled. Therefore, the entire apparatus, without cleaning or change in any way whatsoever, is immediately available for use in making a new proportion from another sample of fluid to be analyzed. Since the second operation is the precise counterpart of the first, this proportioning can be continued indefinitely without any need for washing of the equipment. Further still, since the proportioning its entirely automatic and precise, a perfect proportioning will result each time. Also, because of the lightness of the equipment and the need only for delicate finger pressure, no fatigue is involved, and the same operator can perform a great many operations without fatigue or without diminishing the accuracy of the proportioning in any way whatsoever.

Some occasions may arise, however, where a larger proportion of the second fluid which is to be analyzed is needed, for example, if the second fluid is more than about five percent of the maximum capacity of the device. Some expedient other than the beveling technique heretofore described in connection with the longer rod 33 may be preferable.

As an example of a second form of the invention, attention is directed to FIGURES 6 and 7 where a longer rod 33′ is made use of. In this instance the rod 33′ is substantially longer than the shorter rod 32. In the last described form the rod 33′ has at its free end 40 a head 41 which provides an upwardly facing shoulder 42. The upwardly facing shoulder 42 is adapted to engage an inner surface 43 of the flange 20 which may, for example, be on the wing 22. It is clear that the spacing between the free end 36 of the rod 32 and the shoulder 42 of the rod 33′ determines the additional outward movement of the plunger 12, and accordingly the increase in available volume of the chamber 17 for measuring the amount of the fluid to be drawn into the proportioning syringe.

In the operation of this form of the device, the first fluid which is in substantially greater quantity is drawn into the chamber 17 in the same manner as has been heretofore described in the first detailed form of the invention, namely by inserting the sampling needle in an appropriate vessel or flask and withdrawing the plunger until the rod 32 can be seated upon the flange in the manner shown in FIGURE 6. Thereafter, by inserting the sampling needle 18 in the container of the second fluid to be sampled, the handle 31 and plunger 12 is withdrawn further until the shoulder 42 is stopped against the inner surface 43 of the flange 20. Since the positioning of the shoulder 42 can be precisely established in advance by comparison with a standard the amount of the second fluid added to the needle will be a precisely measured amount in every instance. Here again, when the fluids are discharged, the diluent follows the second fluid outwardly through the sampling needle 13 and again washes the sampling needle in this operation. Accordingly, in this form of the device also, the device can be repeatedly used without need for chemically cleaning and with absolute assurance that the proportioning of each successive operation will be precisely the same. All of the advantages of the first form are present in the second form.

When it ultimately becomes advisable to wash the device, the plunger can be entirely withdrawn from either form by rotating the handle to a proper position to have the rods clear and then the plunger extracted so that the chamber 17 can be washed and sterilized as well as washing and sterilizing the plunger itself. For this purpose, as previously noted, the sampling needle 13 can be removed.

What is claimed is:

1. A multiple fluid measuring device comprising a syringe barrel, said barrel having a filler opening at one end and a relatively large opening at the other end, a plunger extending through said relatively large opening having a fluid tight sliding fit in said barrel and a handle on said plunger, a flange on said barrel extending around a portion of the perimeter of the barrel, said flange having a clearance at one portion of the perimeter, a first gage rod on the plunger extending along the exterior of said plunger, said rod being adapted to pass said clearance when the plunger is passed through a barrel filling cycle, the free end of said rod being adapted to be moved into engagement with said flange whereby to determine the precise amount of fluid drawn into said barrel, a second rod on the plunger extending along said plunger, said second rod being longer than the first rod, and a shoulder on the free end of said second rod at a location further from the handle than the location of said free end of the first identified rod and precisely fixed in position relative to the plunger, said shoulder having an effective engagement with said flange substantially no greater in extent than the cross-sectional area of said second rod, said area having a position of engagement with said flange with the plunger moved further outwardly of said barrel a distance productive of an increase in the fluid contents of said barrel precisely determined by the difference in positions of said free end of the first rod and said shoulder.

2. A multiple fluid measuring device comprising a syringe barrel, said barrel having a filler opening at one end and a relatively large opening at the other end, a plunger extending through said relatively large opening having a fluid tight sliding fit in said barrel, a handle on said plunger, a flange on said barrel extending around a portion of the perimeter of the barrel, said flange having a clearance at one portion of the perimeter, a first gage rod on said handle extending along the exterior of said plunger to a location intermediate opposite ends thereof, said rod being adapted to pass said clearance when the plunger is passed through a barrel filling cycle, the free end of said rod being adapted to be moved into engagement with said flange whereby to determine the precise amount of fluid drawn into said barrel, a second rod extending from said handle along said plunger, said second rod being longer than the first rod, and a shoulder on the free end of said second rod at a location further from the handle than the location of said free end of the first identified rod, said shoulder having a position of engagement with said flange with the plunger moved further outwardly of said barrel a distance productive of an increase in the fluid contents of said barrel determined by the difference in positions of said free end of the first rod and said shoulder, a bevel on said flange facing said longer rod and a substantially complementary bevel on the free end of said second identified rod facing said flange, said bevels being adapted to guide the second rod into position on said flange whereby to precisely determine the volume of a second fluid in said barrel.

3. A multiple fluid measuring device comprising a syringe barrel, an extension at one end of said barrel having a relatively small opening therein, and a hollow needle member removably attached to said extension, said barrel having a relatively large opening at the end thereof opposite said small opening, a plunger extending through said relatively large opening having a fluid tight sliding fit in said barrel, a handle on said plunger, a flange on said barrel extending around a portion of the perimeter at the end of the barrel having the relatively larger opening, said flange having a clearance at one portion of the perimeter, a first gage rod on said handle extending along the exterior of said plunger so that a free end thereof is at a location intermediate opposite ends thereof, said rod being adapted to pass said clearance when the plunger is passed through a barrel filling cycle, the free end of said rod being adapted to be moved into engagement with said flange whereby to determine the precise amount of fluid drawn into said barrel, a second rod extending from said handle along said plunger parallel to said first rod, said second rod being longer than the first rod, and a shoulder on the free end of said second rod at a location further from the handle than the location of said free end of the first identified rod, said shoulder having a position of engagement with said flange with the plunger moved further outwardly of said barrel a distance productive of an increase in the fluid contents of said barrel determined by the difference in effective lengths of said rods, a bevel on an edge of said flange facing said longer rod and a substantially complementary bevel on the free end of said second identified rod facing said flange whereby said plunger is moved outwardly during movement of said bevels over each other to precisely determine the volume of a second fluid in said barrel, said plunger being movable into said barrel to a position wherein all the measured amounts of the second and the first identified fluid are passed successively from the barrel.

4. A multiple fluid measuring device comprising a syringe barrel, said barrel having a filler opening at one end and a relatively large opening at the other end, a plunger extending through said relatively large opening having a fluid tight sliding fit in said barrel, a handle on said plunger, a flange on said barrel extending around a portion of the perimeter at the end of the barrel, said flange having a clearance at one portion of the perimeter, a first gage rod on said handle extending along the exterior of said plunger, said rod being adapted to pass said clearance when the plunger is passed through a barrel filling cycle, the free end of said rod being adapted to be moved into engagement with said flange whereby to determine the precise amount of fluid drawn into said barrel, a second rod extending from said handle along said plunger, said second rod being longer than the first rod, and a shoulder on the free end of said second rod at a location further from the handle than the location of said free end of the first identified rod, said shoulder having a fixed inflexible position relative to the barrel and having a position of engagement with said flange with the plunger moved outwardly of said barrel a distance productive of a precise increase in the fluid contents of said barrel determined by the difference in positions of said free end of the first rod and said shoulder, said shoulder facing the side of said flange opposite the handle of the plunger and adapted to be drawn into engagement with the said side of said flange whereby to precisely determine the volume of a second fluid in said barrel.

5. A multiple fluid measuring device comprising a syringe barrel, graduations on said barrel, an extension at one end of said barrel having a relatively small opening therein, and a hollow needle member removably attached to said extension, said barrel having a relatively large opening at the end thereof opposite said small opening, a plunger extending through said relatively large opening having a fluid tight sliding fit in said barrel, a handle on said plunger, a flange on said barrel extending around a portion of the perimeter at the end of the barrel having the relatively larger opening, said flange having a clearance at one portion of the perimeter, a first gage rod on said handle extending along the exterior of said plunger to a location intermediate opposite ends thereof, said rod being adapted to pass said clearance when the plunger is passed through a barrel filling cycle, the free end of said rod being adapted to be moved into engagement with said flange whereby to determine the precise amount of fluid drawn into said barrel, a second rod extending from said handle along said plunger parallel to said first rod, said second rod being longer than the first rod, and a shoulder on the free end of said second rod at a location further from the handle than the location of said free end of the first identified rod, said shoulder having an effective area of engagement with said flange not substantially greater than the cross-sectional area of said second rod, said shoulder having a fixed position of precise engagement with said flange with the plunger moved further outwardly of said barrel a distance productive of an increase in the fluid contents of said barrel determined by the difference in positions of said free end of the first rod and said shoulder, said shoulder having a position facing an inner side of said flange and adapted to be drawn into engagement with said inner side whereby to precisely determine the volume of a second fluid in said barrel, said plunger being movable into said barrel to a position wherein all the measured amounts of the second and the first identified fluid are passed successively from the barrel.

6. A multiple liquid measuring device comprising a syringe barrel including a filler opening at one end having a hollow sampling needle attached thereto of predetermined volume and a relatively large opening at the other end, a plunger including a free end extending through said relatively large opening with a liquid tight sliding fit in said barrel and a handle at the other end of said plunger, a flange on said barrel extending around the exterior of the barrel, said flange having a clearance recess therethrough, multiple gage means exterior with respect to the plunger including accessory means on the plunger adapted to pass freely through said clearance when the plunger is passed through a multiple measuring cycle, said gage means comprising two sets of shoulders between said accessory means and said flange in fixed positions relative to the handle of the plunger and the barrel during measurement operations, one of said sets of shoulders being at a location providing for a relatively large volume of a selected liquid in the barrel substantially greater than the volume of said sampling needle, the other of said sets of shoulders being at a location spaced a relatively short distance from said one of said sets of shoulders providing for an increase in volume in the barrel less than the volume within said sampling needle when the plunger is withdrawn, whereby a second liquid different from the liquid of larger volume is prevented from entering the barrel.

7. A multiple fluid measuring device comprising a syringe barrel, said barrel having a filler opening at one end and a relatively large opening at the other end, a plunger including a free end extending through said relatively large opening having a fluid tight sliding fit in said barrel and a handle at the other end of the plunger, a flange on said barrel extending around the exterior of the barrel, said flange having a clearance recess therethrough, gage means exterior with respect to the plunger including accessory means on the plunger adapted to pass freely through said clearance when the plunger is passed through a barrel filling cycle, said gage means comprising a plurality of levels of engagement between said accessory means and the flange providing thereby shoulders in fixed positions relative to the handle of the plunger and the barrel during measuring operations, said shoulders being spaced axially at different distances from the handle with one of said shoulders relatively closer to the handle, said shoulders being determinative of successive positions of engagement of said accessory means with said flange with said one of said shoulders being first in engagement whereby to precisely measure inflow of fluid into said barrel in separate increments.

8. A multiple fluid measuring device comprising a syringe barrel, said barrel having a filler opening at one end and a relatively large opening at the other end, a plunger including a free end extending through said relatively large opening having a fluid tight sliding fit in said barrel and a handle at the other end of the plunger, a flange on said barrel extending around the exterior of the barrel, said flange having a clearance recess therethrough, gage means exterior with respect to the plunger including accessory means on the plunger adapted to pass freely through said clearance when the plunger is passed through a barrel filling cycle, said gage means comprising a plurality of levels of engagement between said accessory means and the flange providing thereby shoulders in fixed positions relative to the handle of the plunger and the barrel during measuring operations, said shoulders being spaced axially at different distances from the handle with one of said shoulders relatively closer to the handle, said shoulders being determinative of successive positions of engagement of said accessory means with said flange with said one of said shoulders being first in engagement whereby to precisely measure inflow of fluid into said barrel in separate increments, and an oblique cam engagement between said flange and said accessory means whereby to guide the gage means into measuring position.

References Cited by the Examiner

UNITED STATES PATENTS 2,607,343   8/1952   Sarver.

M. HENSON WOOD, Jr., *Primary Examiner.*

LOUIS J. DEMBO, *Examiner.*